United States Patent [19]
Carrico

[11] 4,117,049
[45] Sep. 26, 1978

[54] FLEXIBLE MULTI-COLUMNAR FLUID TREATMENT CELLULAR APPARATUS

[76] Inventor: Arnold J. Carrico, 930 Pinto Ct., Walnut Creek, Calif. 94596

[21] Appl. No.: 777,567

[22] Filed: Mar. 14, 1977

[51] Int. Cl.² ............................................. B01F 3/04
[52] U.S. Cl. ..................................... 261/111; 55/240; 195/142; 210/150; 261/114 R; 261/DIG. 11
[58] Field of Search ................................ 261/108–113, 261/114 R, DIG. 11, 115, 117, 118, 94–98, DIG. 72; 210/150, 151; 55/240, 241; 428/178, 179, 188; 195/109, 142–144

[56] References Cited

U.S. PATENT DOCUMENTS

| | | | |
|---|---|---|---|
| 1,743,188 | 1/1930 | Byrnes | 261/111 X |
| 2,266,335 | 12/1941 | Roche, Jr. et al. | 261/111 |
| 2,885,195 | 5/1959 | Haselden | 261/112 |
| 3,116,989 | 1/1964 | Warren | 261/111 X |
| 3,231,450 | 1/1966 | Riel | 428/188 X |
| 3,799,516 | 3/1974 | Furlong et al. | 261/111 |
| 3,862,280 | 1/1975 | Polovina | 261/112 |

FOREIGN PATENT DOCUMENTS 486,136  9/1952  Canada ..................................... 261/112

Primary Examiner—Richard L. Chiesa
Attorney, Agent, or Firm—Willis Bugbee

[57] ABSTRACT

For fluid interchange treatment, a flexible collapsible structure is provided which consists of stacked horizontal partition walls formed from pairs of sheets of nonwoven fabric material such as felt heat-joined by plastic coatings on their inner surfaces and disposed in vertically-spaced parallel arrangement and sealed at their sides by accordion-folded sheets of flexible collapsible material. The paired sheets contain ports which are offset relatively to one another in successive sheets. The paired fabric sheets and their plastic-coated inner surfaces are provided with openings to form cells with which the ports communicate, these openings being so arranged that, a multi-columned collapsible structure of parallel cellular formation results, with independent zigzag paths between top and the bottom of each cellular column. Thus, heat transfer is greatly enhanced by the retarded flow of the hot water horizontally across the liquid-absorbing fibrous surfaces of the felt on the exposed outer sides of the partition walls. The structure is preferably suspended from an external framework, the suspension causing the laminated partition walls to separate into parallel columns of laterally-interfitting vertically staggered cells.

6 Claims, 11 Drawing Figures

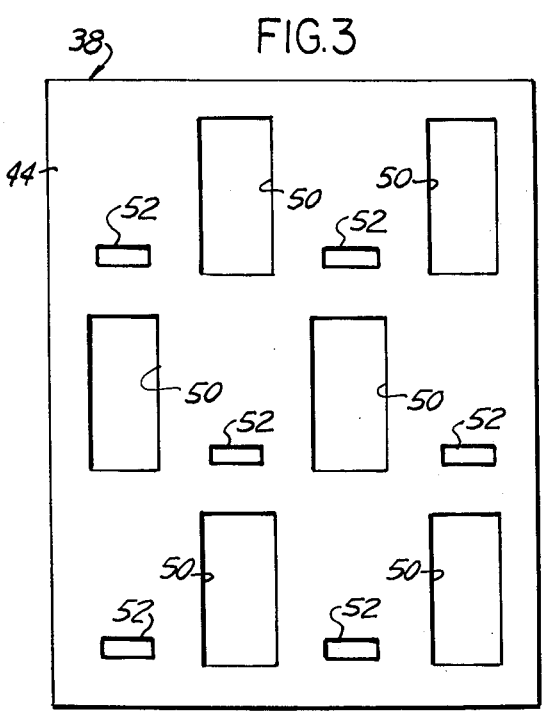
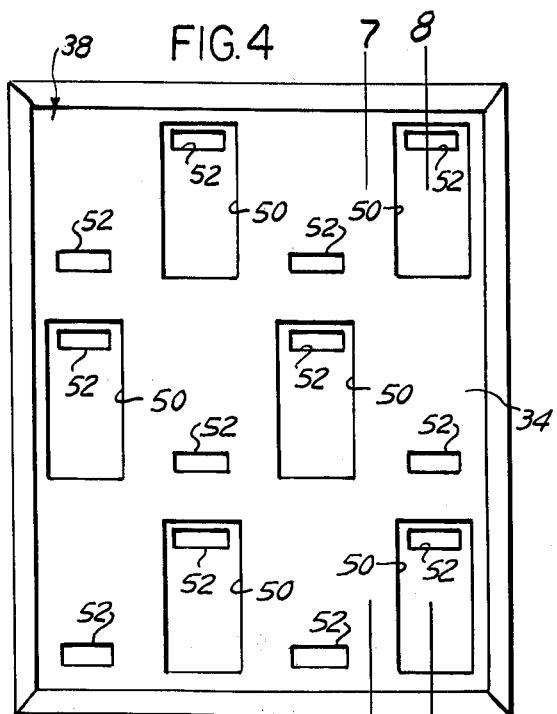
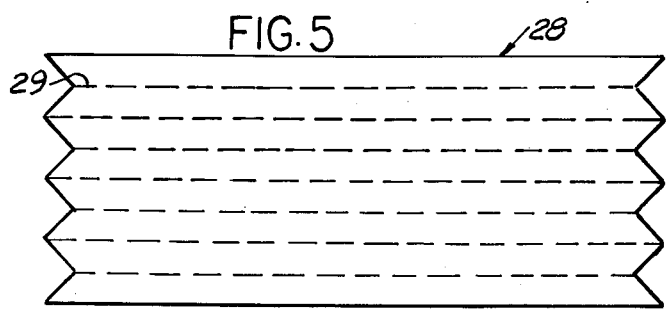
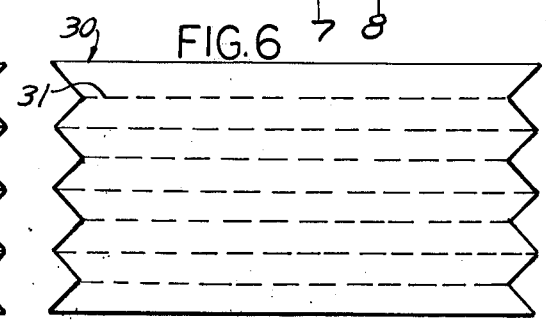
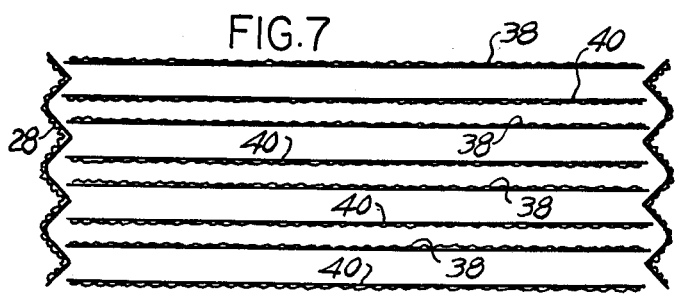
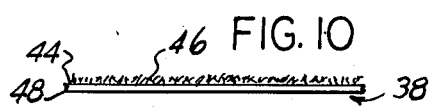
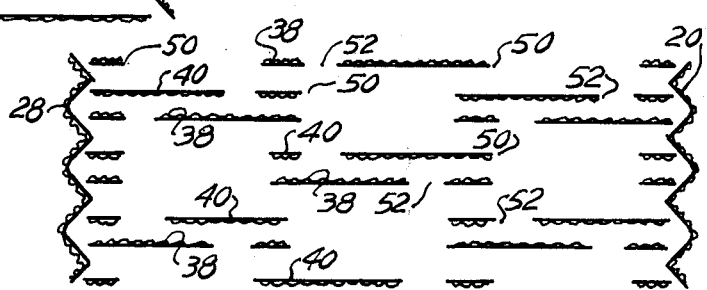
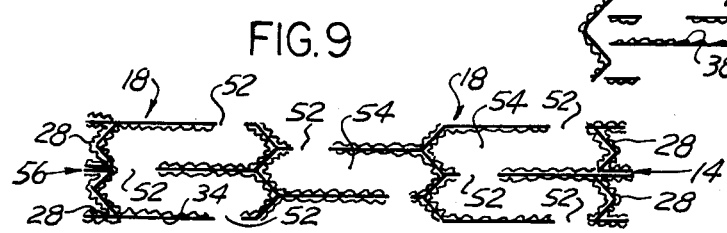

4,117,049

FLEXIBLE MULTI-COLUMNAR FLUID TREATMENT CELLULAR APPARATUS

SUMMARY OF THE INVENTION

The invention primarily resides in the multi-columned cellular structure of flexible sheet material provided with staggered fluid inlet and outlet ports between successive parallel horizontal partition walls with exposed felt or other fibrous surfaces providing fluid interchange between rising and descending fluids flowing in zigzag paths in the thus-formed separate cellular columns. It also resides in the method of making the structure from paired plastic-joined fabric partition walls assembled by heat sealing them in spaced parallel relationship between surrounding accordion-shaped side walls of flexible plastic-coated sheet material. It further resides in the provision of a single pattern of die-cut apertured plastic-coated fabric sheet which when cut from fabric coated with adhesive such as plastic on either of its opposite sides can be rearranged in various ways to provide four different laminated partition walls forming superimposed cells disposed in staggered planes and with staggered ports defining the above-mentioned zigzag flow of fluids therethrough.

ADVANTAGES OF THE INVENTION

The above-described invention has numerous applications, such as for heat exchangers, chemical treatment apparatus, air and gas scrubbers, evaporation and cooling towers and condensers, contact apparatus for sludge aeration, biological treatment apparatus for cultivating yeasts and antibiotics, and for desalination of sea water by air humidification. The flexibility of the structure causes it to possess light weight, whereas the inexpensive materials of which it is composed give it a low cost of production and sales. The laminated felt-to-plastic-to-plastic-to-felt construction not only enables heat sealing methods to be employed in its manufacture but the plastic internal layer thus provided for each partition wall creates greatly enhanced strength to the structure without involving the use of metals or other heavy materials. The elimination of such metallic materials not only reduces the cost of the structure but avoids the deteriorating effects of many liquids and gases upon such metals.

In the drawings,

FIG. 3 is a top plan view of one of the apertured plastic-coated fabric component sheets used in making the laminated horizontal partition walls of the structure shown in FIGS. 1 and 2.

FIG. 4 is a top plan view of the structure shown in FIGS. 1 and 2 as composed of a stack of the vertically-spaced partition walls of FIG. 2 as joined in vertically-spaced parallel relationship by the accordion-folded flexible plastic-coated fabric side walls of FIGS. 5 and 6;

FIG. 5 is a side elevation of a portion of one of the longer plastic-coated flexible accordion-folded fabric side wall sheets joining the side edges of the partition walls of FIGS. 2 and 4;

FIG. 6 is a side elevation similar to FIG. 5 but of a portion of one of the shorter plastic-coated flexible accordion-folded sheets;

FIGS. 7 and 8 are fragmentary vertical sections taken along the lines 7—7 and 8—8 respectively in FIG. 4, showing diagrammatically the relative positions of the four uppermost partition walls as divided into their plastic-coated felt component sheets before pressing together and heat sealing;

FIG. 9 is a fragmentary vertical section similar to FIG. 8 but showing the relative positions of the laminated heat-sealed partition walls after heat-sealing them and pulling them apart to form multiple cells;

FIG. 10 is a highly-magnified vertical section through the bottom-coated upper component sheet of the laminated horizontal uppermost partition wall shown in FIGS. 1 to 4 inclusive; and FIG. 11 is a vertical section similar to FIG. 10, but through the top-coated lower component sheet of the laminated horizontal uppermost partition wall shown in FIGS. 1 to 4 inclusive.

Figure 1:
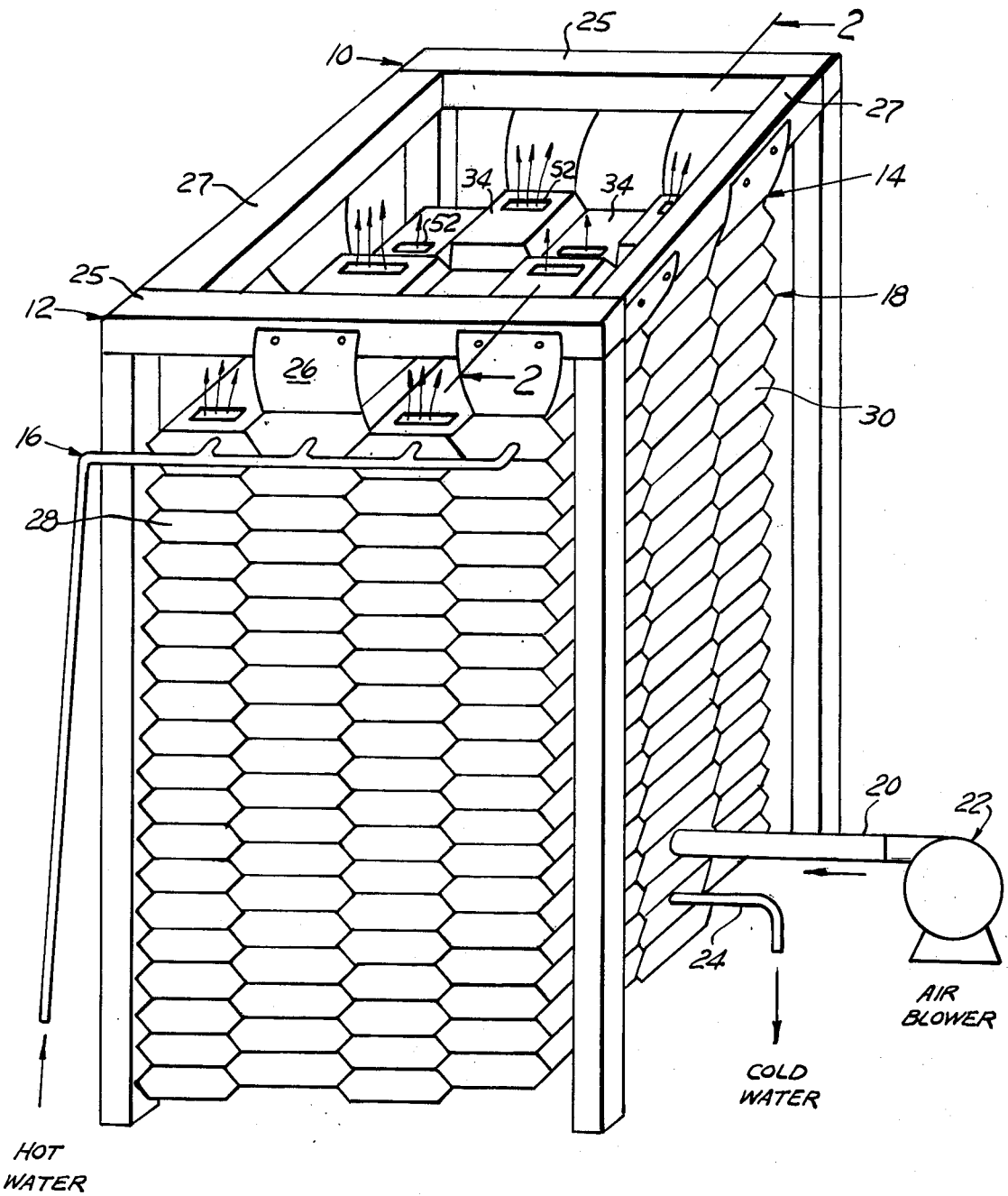
FIG. 1 is a perspective view looking downward from above, of one form of flexible columnar fluid treatment cellular structure of this invention, as suspended from a supporting frame and fed with air from an air blower at the bottom while supplied with descending hot water at the top to serve as a cooling tower.

Referring to the drawings in detail, FIG. 1 shows, in perspective, a preferred form of the flexible columnar cellular fluid treatment apparatus, generally designated 10, as consisting generally of an open-centered external suspension 12 from which is hung a flexible collapsible cellular columnar structure 14, the upper portion of which is supplied with a liquid inlet conduit 16 through which liquid to be treated, such as hot water to be cooled, flows into the multiple cellular columns 18 while these columns are supplied with a coolant gas from a gas inlet conduit 20, such as with cold air from a power-driven blower 22. The upwardly-flowing air from the conduit 20 cools the downwardly-flowing liquid from the liquid inlet pipe 16 so that it emerges at the bottom of the structure 14 through a cooled liquid outlet conduit 24.

The flexible collapsible cellular columnar structure 14 is suspended from the frame 12 by straps 26 (FIG. 1) fastened to the end and side members 25 and 27 respectively and supported in their suspended positions by legs 32 such that the flexible nature and accordion-like construction of the structure 14 causes the latter to stretch and extend downward toward the ground level on which the legs 32 stand. The multi-columnar cellular structure 14 (FIG. 2) is composed of laminated horizontal apertured partition walls, generally designated 34, (FIG. 4) joined to one another at their outer edges 36 (FIG. 2) by the accordion-folded side sheets 28 and 30 folded along their respective fold lines 29 and 31 (FIGS. 5 to 9) in the heat-sealing manner described below.

Figure 2:
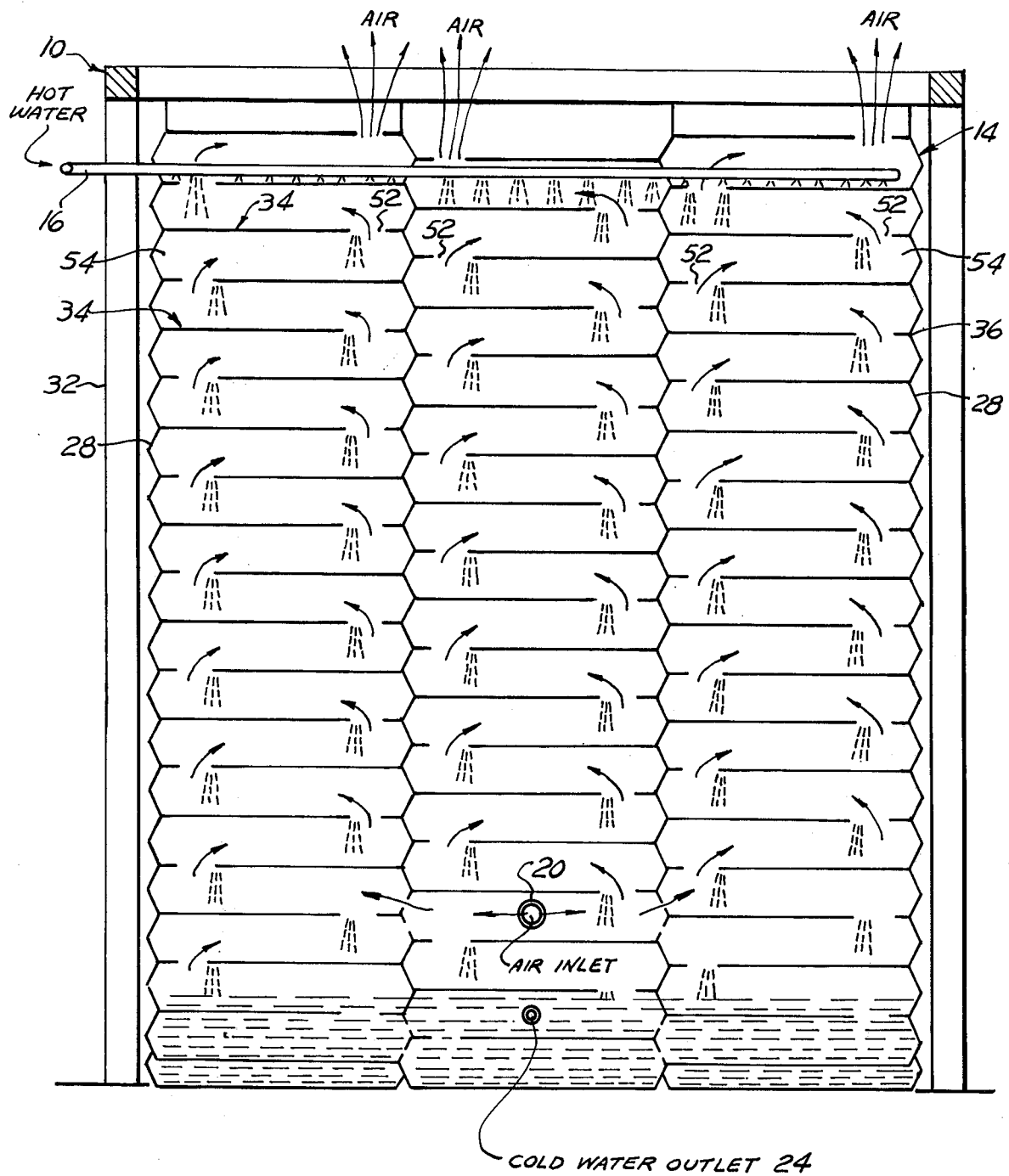
FIG. 2 is a diagrammatic vertical section taken along the line 2—2 in FIG. 1, omitting the wall thickness lines.

In the example shown in FIGS. 1, 2 and 4, these horizontal partition walls 34 as initially constructed consist of laminated felt or other flexible fabric and plastic sheets which when suspended assume the offset positions shown in FIGS. 1 and 2. The partition walls 34 are made up entirely of a pair of apertured rectangular component sheets 38 and 40 (FIG. 3) die cut from a single die in a single pattern but plastic-coated on opposite sides to form two sets of sheets arranged in different orientations according to the schedule set forth below. Each bottom-coated component sheet 38 (FIG. 10) consists of a non-woven felt or other fabric sheet 44 (FIG. 10) having individual fibers 46 on the top side and coated with a synthetic plastic film 48 on its bottom side. Each top-coated component sheet 40 (FIG. 11) has its felt sheet 44 coated with plastic film 48 on its top side. A suitable plastic film has been found to be polyethylene plastic film. The plastic coating 48 provides not only a convenient means of heat-sealing the component sheets 38 and 40 to one another but also stiffens the resulting partition wall 34 so as to increase its structural strength. The liquid-absorbing fibers 46 of the felt sheets 44 provide an extended flow-retarding liquid-gas contact surface which enhances the efficiency of the component sheets 38 and 40 and hence that of the partition wall 34 made therefrom.

Each component sheet 38 or 40 is provided with large rectangular openings 50 for the purpose described below, and is also provided with smaller rectangular ports 52 arranged in staggered or offset relationship to the larger openings 50. The ports 52 serve as gas and liquid inlet or outlet ports, depending upon how the partition walls 34 are arranged as determined by the orientation of their component sheets 38 and 40 as described more fully below. It is important to observe that one of the advantages of this invention resides in the provision of a single pattern of cutting die which cuts the two sets of sheets 38 or 40 from bottom-coated or top-coated coils of fabric respectively. The component sheets 38 and 40 are arranged in different orientations to provide the partition walls 34. They are also arranged in different orientations to produce the staggered locations of the ports 52 so as to form a zigzag path for the gases and liquids flowing respectively upward and downward in opposite directions through the cells 54 thus formed in the above-described manner in the cellular columns 18, as shown in FIG. 2 and described in more detail below. Thus, as stated above, the horizontal partition walls 34, the uppermost of which is shown in top plan view in FIGS. 1, 3 and 4, are each made up of a pair of die-cut sheets 38 and 40 of fibrous material such as felt, cut according to the single pattern shown in FIGS. 3 and 4 but in two sets. One set of such sheets 38 is cut from sheet material with an adhesive layer 48 on the bottom (FIG. 10) whereas the other set of sheets 40 is cut with the same die from sheet material with an adhesive layer 49 on the top (FIG. 11).

During manufacture, the sheets 38 and 40 are united in pairs with their adhesive-coated layers facing and engaging one another and disposed in the various orientations according to the schedule set forth below for each group of four partition walls 34 so as to align the various ports and other openings 50 in each pair of united sheets of the two sets yet with their respective ports 52 of alternate partition walls 34 arranged in horizontally-spaced locations (FIG. 2) so as to impart to the stack of vertically-spaced horizontal partition walls 34 the above-mentioned zigzag path of flow for the fluids descending or ascending, as the case may be, in the separate columns of superimposed cells which make up the cellular structure 10. As stated above, polyethylene synthetic plastic has been found suitable for the adhesive layer or coating 48 and the two such layers when placed in contact with one another are caused to adhere by the application of heat such as by placing the entire structure 10 in a suitably configured press (not shown) in a conventional microwave oven.

Each four horizontal partition walls 34 form a group 56 in an arrangement which then repeats itself and which is made up of eight of the component sheets 38 (FIG. 10) or 40 (FIG. 11) are numbered from first to eighth from top to bottom. The first and second component sheets 38 and 40 when united make up the first or topmost partition wall 34, the third and fourth sheets the next or second partition wall, the fifth and sixth sheets the third partition wall, and the seventh and eighth sheets the fourth partition wall, counting from the top downward in FIG. 2. Bottom-coated fabric component sheets 38 (FIG. 10) comprise the first, sixth, seventh and eighth sheets, whereas the top-coated such sheets 40 comprise the second, third, fourth and fifth sheets. The first sheet, the bottom-coated top sheet 38 of the uppermost partition wall 34 shown in FIGS. 1 to 4 inclusive and 7 to 9 inclusive is consequently cut by the cutting die with the felt or other fibrous material uppermost. The eighth sheet 38 is cut the same as sheet 38 but is then turned over from top to bottom. The sixth sheet 38 is cut from the same as the first sheet 38 but is then turned over from left to right. The seventh sheet 38 is cut the same as the first sheet 38 but is then rotated 180 degrees without being turned over. The fourth sheet 40, however, of each group 56 of partition walls 34 is top-coated and is cut by the cutting die with the plastic-coated side of the fabric uppermost. The fifth sheet 40 is cut the same as the fourth sheet 40 but is then turned over from top to bottom. The third sheet 40 is cut the same as the fourth sheet 40 but is then turned over from left to right. The second sheet 40 is cut the same as the fourth sheet 40 but is then rotated 180° without being turned over. The subsequent sheets 38 and 40 for the subsequent groups 56 each containing four partition walls 34 below the group 56 containing the first four partition walls 34 thus described are made up in the same sequence and according to the same above-described schedule as the first four partition walls 34 described above. In other words, each group 56 of four partition walls 34 repeats itself in passing downward from the top to the bottom of the cellular columnar structure 14 of the fluid treatment cellular apparatus 10.

In the manufacture of the cellular structure 10, the sheets 38 or 40 of which it is composed are assembled in the above-mentioned order and orientation in the above-mentioned press with the accordion-shaped side walls 28 and 30 folded between and overlapping the edge portions of the partition walls 34 (FIGS. 7, 8 and 9). The entire assembly then is moved into the above-mentioned micro-wave oven and the latter energized, the resulting heat causing the plastic-to-plastic adhesive layers 48 to adhere to one another wherever they are in contact, but not to adhere where a pair of such plastic-to-plastic adhesive layers 48 is not in contact, as in the ports 52 and openings 50, which define the individual cells 54 of the structure 14. Vertical sections through two portions of the above-described arrangement are shown, before heating, in FIGS. 7 and 8, whereas a similar vertical section of the united structure, after heating, is shown in FIG. 9. In FIGS. 2, 7, 8 and 9, the wavy horizontal lines represent the felt or other fibrous sheets and the solid horizontal lines represent the plastic or other adhesive layers. After heat sealing in the above manner, the flexible cellular columnar structure 14 is suspended from the frame 12 in the above-described manner from the straps 26. Thereupon the weight of the various components thereof causes the structure 14 to expand downward so that a typical section (FIG. 9) is made up of the separate and independent multi-cellular columns 18 which dispose themselves in the offset arrangements of cells 54 shown in FIGS. 1, 2 and 9. Each such column 18 is composed of a stack of individual cells 54 arranged offset relatively to one another vertically and staggered horizontally and having their respective ports 52 also offset horizontally to provide the zigzag flow of fluid either upward or downward, depending on whether the fluid is a gas or a liquid.

The operation of the invention (FIGS. 1 and 2) is believed to be clear from the foregoing description. A liquid to be treated, such as hot water to be cooled, is supplied to the upper end of the columnar structure 14 through the conduit 16, whence it flows across the fibrous felt sheets 44 and descends in a cascade from partition wall 34 to partition wall 34 by way of the ports 52 in a zigzag path while a gas, such as air as a coolant, is supplied from the blower 22 through the conduit 20 to the lower portion of the cellular structure 14. The interaction of the rising cold air through the pipe 20 as a coolant with the liquid descending and flowing through and between the fibers 46 of the felt or other fabric sheets 38 and 40 causes the liquid to be cooled and to be discharged through the cooled liquid outlet conduit 24. The pressure of the cold air supplied from the blower 22 through the air inlet conduit 20 also serves, in part, to inflate the cellular structure 14 and to assist in combination with the weight thereof to maintain it in the offset configuration shown in FIGS. 1, 2 and 9.

I claim:

1. A flexible columnar cellular fluid treatment apparatus, comprising
    a flexible collapsible upright structure adapted to be suspended from a support and including multiple generally horizontal substantially flat parallel partition walls of non-self-sustaining flexible material disposed in vertically-spaced generally-parallel relationship and also including generally-vertical accordion-folding zigzag-bent side walls of non-self-sustaining flexible material surrounding and engaging the edge portions of said partition walls in fluid-tight relationship therewith,
    said partition walls and said side walls collectively defining a multiplicity of tiers of fluid treatment cells having laterally-spaced upper and lower fluid ports through their respective upper and lower partition walls,
    said ports being disposed near the opposite ends of their respective cells in alternating succession defining a zigzag but generally-vertical fluid flow path through said cells of said structure,
    and means for respectively admitting and discharging a treating fluid and a treated fluid at vertically-spaced locations in said structure for opposite directions of fluid flow therethrough.

2. A flexible columnar cellular fluid treatment apparatus, according to claim 1, wherein each pair of adjacent horizontal partition walls is subdivided into a plurality of horizontally-adjacent cells with interfitting V-shaped end walls disposed in independent generally vertical adjacent columns, and wherein the portions of said partition walls within said columns have independent laterally-spaced ports therethrough disposed in generally vertical zigzag fluid flow paths through said columns.

3. A flexible columnar cellular fluid treatment apparatus, according to claim 2, wherein said portions of said partition walls within said adjacent columns are offset vertically at different levels in laterally-interfitting engagement relatively to one another in the suspended position of said structure.

4. A flexible columnar cellular fluid treatment apparatus, according to claim 1, wherein said partition walls have liquid-absorbent fibrous surfaces retarding fluid flow thereacross and promoting oppositely-flowing fluid interaction thereat.

5. A flexible columnar cellular fluid treatment apparatus, according to claim 1, wherein said horizontal partition walls are composed of upper and lower sheets of fibrous material.

6. A flexible columnar cellular fluid treatment apparatus, according to claim 5, wherein an intermediate layer of adhesive material is disposed between said fibrous sheets in uniting engagement therewith.

* * * * *